(12) United States Patent
Spinelli et al.

(10) Patent No.: US 11,392,195 B2
(45) Date of Patent: Jul. 19, 2022

(54) METHODS AND APPARATUS FOR ACTIONS, ACTIVITIES AND TASKS CLASSIFICATIONS BASED ON MACHINE LEARNING TECHNIQUES

(71) Applicant: StrongArm Technologies, Inc., Brooklyn, NY (US)

(72) Inventors: Michael Patrick Spinelli, Croton, NY (US); SivaSankara Reddy Bommireddy, Brooklyn, NY (US); Michael Dohyun Kim, Sunnyside, NY (US); Sean Michael Petterson, Patchogue, NY (US)

(73) Assignee: StrongArm Technologies, Inc., Brooklyn, NY (US)

(*) Notice: Subject to any disclaimer, the term of this patent is extended or adjusted under 35 U.S.C. 154(b) by 0 days.

(21) Appl. No.: 17/348,247

(22) Filed: Jun. 15, 2021

(65) Prior Publication Data
US 2021/0389817 A1 Dec. 16, 2021

Related U.S. Application Data

(60) Provisional application No. 63/039,178, filed on Jun. 15, 2020.

(51) Int. Cl.
*G06F 3/01* (2006.01)
*G06K 9/62* (2022.01)
*G06N 20/00* (2019.01)

(52) U.S. Cl.
CPC .............. *G06F 3/011* (2013.01); *G06K 9/628* (2013.01); *G06N 20/00* (2019.01)

(58) Field of Classification Search
None
See application file for complete search history.

(56) References Cited

U.S. PATENT DOCUMENTS

2017/0124550 A1* 5/2017 Oberli ................... G07B 15/02
2018/0206766 A1* 7/2018 Blahnik ............... A61B 5/7435
(Continued)

OTHER PUBLICATIONS

Ye Liu, Liqiang Nie, Li Liu, David S. Rosenblum, "From Action to Activity: Sensor-based Activity Recognition," 2016, Neurocomputing 181:108-115 (Year: 2016).*
(Continued)

*Primary Examiner* — Michael J Cobb
(74) *Attorney, Agent, or Firm* — Greenberg Traurig, LLP

(57) ABSTRACT

Systems and methods of the present disclosure enable automated recognition of user performed activities and tasks using sensor data by receiving raw sensor data while a user performs a series of activities wearing at least one sensor for a predetermined interval of time. The raw sensor data is converted into a set of feature values. An action recognition machine learning model is used to generate action labels indicative of actions performed by the user during the predetermined interval of time based on trained action model parameters and the set of feature values. A task recognition machine learning model is used to generate task labels indicative of tasks performed by the user during the predetermined interval of time based on trained task model parameters, the set of action labels and the set of feature values, and a message is displayed with an indication of the task labels to a user.

18 Claims, 6 Drawing Sheets

(56) References Cited

U.S. PATENT DOCUMENTS

| | | | | |
|---|---|---|---|---|
| 2018/0344215 | A1* | 12/2018 | Ohnemus | A63F 13/798 |
| 2019/0038148 | A1* | 2/2019 | Valys | A61B 5/7267 |
| 2020/0075167 | A1* | 3/2020 | Srivastava | G16H 50/20 |
| 2020/0160399 | A1* | 5/2020 | Rakshit | G06K 9/00664 |
| 2020/0231182 | A1* | 7/2020 | Oba | B60W 50/14 |

OTHER PUBLICATIONS

Ye Liu, Liqiang Nie, Lei Han, Luming Zhang, David S. Rosenblum, "Action2Activity: Recognizing Complex Activities from Sensor Data," 2015, Proceedings of the Twenty-Fourth International Joint Conference on Artificial Intelligence, pp. 1617-1623 (Year: 2015).*

Wesllen Sousa Lima, Eduardo Souto, Khalil El-Khatib, Roozbeh Jalali, and Joao Gama, "Human Activity Recognition Using Inertial Sensors in a Smartphone: An Overview," 2019, Sensors, 19, 3213; pp. 1-28 doi: 10.3390/s19143213 (Year: 2019).*

Enrique Garcia-Ceja, Ramon F. Brena, Jose C. Carrasco-Jimenez, Leonardo Garrido, "Long-Term Activity Recognition from Wristwatch Accelerometer Data," 2014 Sensors, 14, 22500-22524; doi:10.3390/s141222500 (Year: 2014).*

L. Ciabattoni, G. Foresi, A. Monteriù, D. Proietti Pagnotta, L. Romeo, L. Spalazzi, "Complex Activity Recognition System based on Cascade Classifiers and Wearable Device Data," 2018, IEEE International Conference on Consumer Electronics (ICCE), pp. 1-2, doi:10.1109/ICCE.2018.8326283 (Year: 2018).*

Andrea Mannini, Angelo Maria Sabatini, "Machine Learning Methods for Classifying Human Physical Activity from On-Body Accelerometers," 2010, Sensors, 10, 1154-1175, doi:10.3390/s100201154 (Year: 2010).*

Movement, Merriam-Webster Thesaurus, 2021, retrieved from "https://www.merriam-webster.com/thesaurus/Movement", Accessed Nov. 20, 2021 (Year: 2021).*

Motion, Merriam-Webster Thesaurus, 2021, retrieved from "https://www.merriam-webster.com/thesaurus/Motion", Accessed Nov. 20, 2021 (Year: 2021).*

Movement and Motion, Merriam-Webster Dictionary, 2021, retrieved from "https://www.merriam-webster.com/dictionary/movement" and "https://www.merriam-webster.com/dictionary/motion", Accessed Nov. 20, 2021 (Year: 2021).*

* cited by examiner

METHODS AND APPARATUS FOR ACTIONS, ACTIVITIES AND TASKS CLASSIFICATIONS BASED ON MACHINE LEARNING TECHNIQUES

CROSS-REFERENCE TO RELATED APPLICATIONS/CLAIM TO PRIORITY

This application claims priority to U.S. Provisional Application No. 63/039,178 filed on Jun. 15, 2020 and entitled "METHODS AND APPARATUS FOR ACTIONS, ACTIVITIES AND TASKS CLASSIFICATIONS BASED ON MACHINE LEARNING TECHNIQUES," and is herein incorporated by reference in its entirety.

BACKGROUND OF TECHNOLOGY

Physical injuries incubate over time, knowledge regarding individual physical activities can facilitate early intervention and prevention of physical injuries.

SUMMARY OF DESCRIBED SUBJECT MATTER

Some embodiments are directed to an apparatus. The apparatus includes a processor; a set of sensors; and a non-transitory memory storing instructions which, when executed by the processor, causes the processor to capture raw sensor data while a user performs a series of activities wearing the set of sensors for a predetermined time. Thereafter the processor converts the raw sensor data into a set of feature values. The processor inputs the set of feature values into a multi-classification machine learning model to generate a set of categories corresponding to one or more of an activity, action, or tasks performed by the user during the predetermined time, and transmits to the user a message indicative of the one or more activities, actions or tasks.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given about the various embodiments of the present disclosure is intended to be illustrative, and not restrictive.

FIGS. 1 through 6 illustrate computer based systems and methods for activity classification based on machine learning techniques.

As explained in more detail below, the technical solutions disclosed herein include aspects of computational techniques for activity and task recognition. The technical solutions disclosed herein also include systems and methods that capture sensor data and infer from such sensor data activities and task performed by one or more users.

As used herein, the term "action" can refer to a human motion that can be recognized by the system disclosed herein based on raw sensor data. Some examples of actions can include holding an object, bending down, and other suitable actions.

As used herein, the term "activity" can refer to human movements that can be recognized by the system disclosed herein based on a set or combination of actions. Some examples of activities can include walking, lifting, stretching, sitting and other suitable activities.

As used herein, the term "task' can refer to a multifaceted human act that can be recognized by the system disclosed herein based on a set or a combination of activities and/or actions. Some examples of tasks can include moving objects, painting the wing of a windmill and other suitable tasks.

Figure 1:
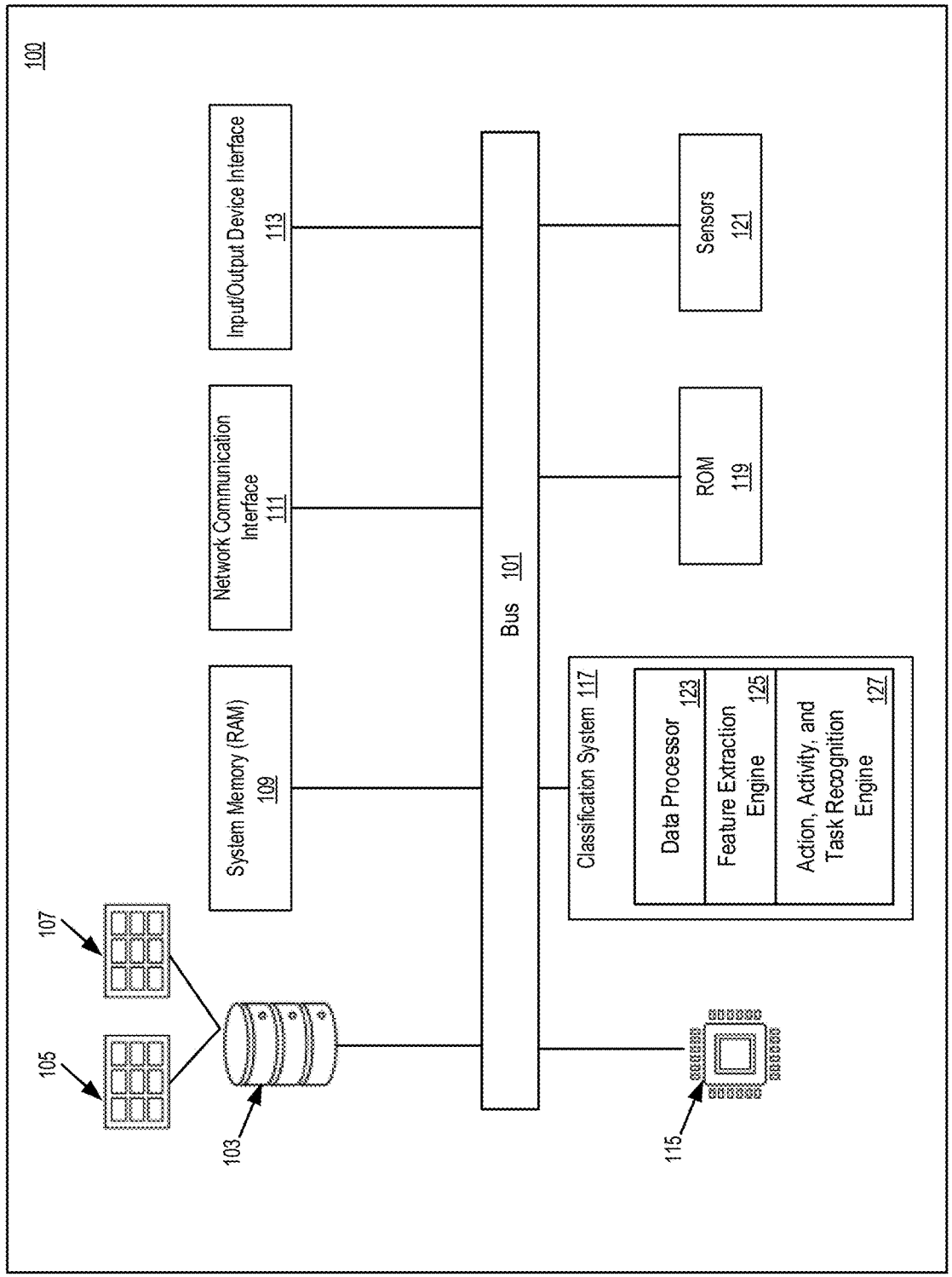
FIGS. 1-6 show one or more schematic flow diagrams, certain computer-based architectures, and/or implementations which are illustrative of some examples of aspects of at least some embodiments of the present disclosure.

FIG. 1 illustrates an example of an implementation of an action, activity, and task classification system, in accordance with one or more embodiments of the present disclosure. In some embodiments, the action, activity, and task classification system 100 can include a communication bus 101, a processor 115, a classification system 117, a system memory (RAM) 109, a read-only memory (ROM) 119, a record database 103, a set of sensors 121, an input/output device interface such 113, and a network communication interface 111.

In some embodiments, the communication bus 101 collectively represents system, peripheral, and/or chipset buses that communicatively connect the numerous internal devices of the system 100. The communication bus 101 may be a physical interface for interconnecting the various components shown in FIG. 1. In some embodiments, the communication bus 101 may be a network interface, router, switch, or other communication interface.

In some embodiments, the system 100 can include a processor 115 configured to perform instructions transmitted via the bus 101 by, e.g., instructions retrieved from accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory, such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of system 100.

In some embodiments, a record database 103 can store data record sets 105 and 107. In some embodiments, the system 100 may receive, store, or have access to multiple data records stored in the record database 103. Data record sets 105 and 107 can include values captured via sensors 121. Such data records can be associated with movements performed by the same or different users.

In some embodiments, the sensors 121 can include one or more of an accelerometer, a gyroscope, a yaw sensor, a pitch sensor, a roll sensor, a magnetometer sensor, or other suitable sensors. In some embodiments, sensors 121 can be strapped to a person or worn in a wearable device (not shown in FIG. 1). In such a case, the sensors 121 can communicate with the system 100 via a wireless or wired communication channel. In some implementations, the wearable device can contain the sensors 121 and other components of the system 100 shown in FIG. 1.

In some embodiments, the classification system 117 can determine actions, activities, and/or tasks performed by a person. In some implementations, the classification system 117 can include a data processor 123, a feature extraction engine 125, and an action, activity, and task recognition engine 127. As further described below, the data processor 123 can compute raw data values captured via the sensors 121 and transform such data values into data sets. The feature extraction engine 125 may utilize the data sets generated by the data processor 123 to generate, for example, multiple time-domain and frequency domain features. Examples of such features are described with reference to FIG. 4 below. The action, activity, and task recognition engine 127 utilizes the features generated by the feature extraction engine 125 to determine or classify actions, activities, and/or tasks performed by one or more users.

In some embodiments, a user may interact with the system 100 via an input/output interface 113. The input/output interface 113 may include, one or more input peripherals and output peripherals. Input peripherals can include, for example, push buttons, touch screens, switches, keyboards, or other suitable interface that can be utilized by a user to interact with the system 100. The output peripherals can include, for example, touch screens, displays, light emitting diodes, vibrating motors, speakers, or other suitable output peripherals.

As shown in FIG. 1, the communication bus 101 can also couple the system 100 to a network through a network communication interface 111. Accordingly, the system 100 can be part of a network of computers (for example a local area network ("LAN"), a wide area network ("WAN"), or an Intranet, or a network of networks, for example, the Internet, or a cloud environment. Thus, the system 100 can receive inputs and transmit outputs or results to other computing devices via the network communication interface 111.

Figure 2:
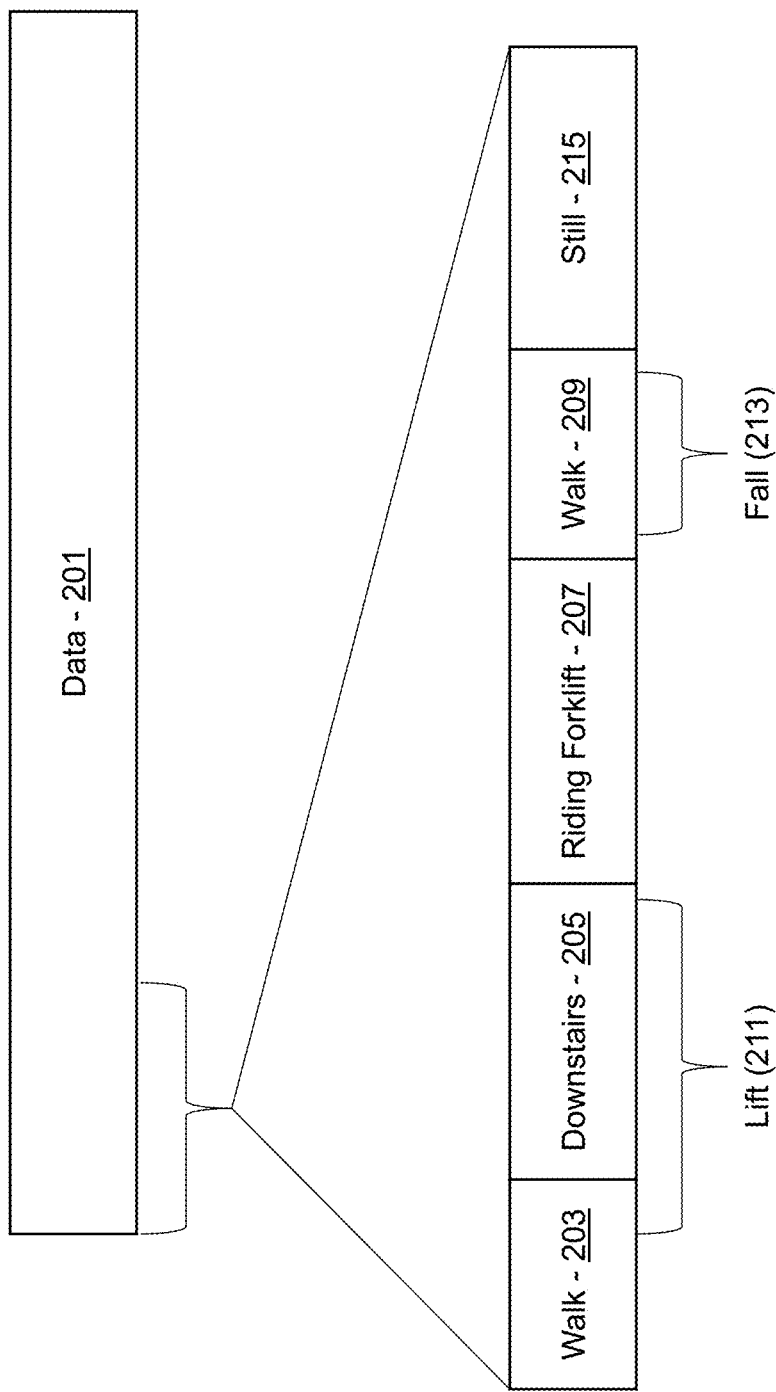

FIG. 2 illustrates an example of sensor raw data processing, in accordance with one or more embodiments of the present disclosure. In some embodiments the system 100 can predict activities performed by a user utilizing user's movement data captured by the sensors 121. In some implementations, the prediction of activities can be performed utilizing input data record sets (e.g., 105 and/or 107 described above) in fixed or dynamic time intervals. For example, in some embodiments, the input data record sets may be analyzed using a time-window of data samples, such as a moving, rolling or sliding time window or any combination thereof such that the input data records sets are sampled for analysis in increments. In some embodiments, the time-windows overlap in time or do not overlap (e.g., where a first window ends, a subsequent window begins).

In some embodiments, the windows may form a window data structure as shown at 201. The window data structure can be implemented, for example, a multidimensional array data structure, a matrix data structure, a vector data structure, or other suitable data structure. In some embodiments, the window data structure includes a window of data record sets where each data entry or data record includes sensor data from a particular timestamp, and the window data structure spans an interval of timestamps. In some embodiments, the interval may include, e.g., 10 seconds, 15 seconds, 20 seconds, 30 seconds, one minutes, five minutes, 10 minutes, 15 minutes, 20 minutes, 30 minutes, one hour, two hours, three hours, or other suitable interval of time for identifying actions, activities and/or tasks based on sensor data.

In some embodiments, the system 100 captures or collects raw data associated with movements performed by a person via the sensors 121. Raw data sets can be collected or captured via the sensors 121. Such raw data sets can include, for example, a timestamp indicating when the data set was captured, one or more values corresponding to yaw movements, one or more values corresponding to pitch movements, one or more values corresponding to a roll movement, three-dimensional accelerometer values (e.g., on the x, y, z axes), three-dimensional gyroscope values (e.g., on the x, y, z, axes), or other suitable values capture via sensors 121. In some implementations, the raw data collected from the sensors 121 can be processed by the data processor 123 discussed with reference to FIG. 1 utilizing filtering processes, for example a low-pass filtering process, a bandpass filtering process, a noise filtering process, and other suitable type of filtering process or any combination thereof.

In some embodiments the sensors 121 can collect or capture data related to a user's movement at a suitable frequency for characterizing the motion of the user. In some embodiments, the frequency may be selected as any suitable frequency or range of frequencies for data collection, such as any frequency or range of frequencies greater than or equal to 0.05 Hertz (Hz) or greater than or equal to 0.1 Hz. In some embodiments, the frequency or range of frequencies may be as high as 1000 Hz. In some embodiments, the frequency may be selected as, e.g., between within the range of 0.01 to 1000 Hz (inclusive), or may be within 0.1 to 250 Hz (inclusive) or other suitable range, such as, e.g., greater than or equal to 0.05 Hz, greater than or equal to 0.1 Hz, greater than or equal to 1 Hz, greater or equal to 5 Hz, greater than or equal to 10 Hz, greater than or equal to 12 Hz, greater than or equal to 15 Hz, greater than or equal to 20 Hz, greater than or equal to 25 Hz, greater than or equal to 30 Hz, greater than or equal to 35 Hz, greater than or equal to 40 Hz, greater than or equal to 45 Hz, greater than or equal to 50, between 1 Hz and 1000 Hz, between 1 Hz and 250 Hz, or any other suitable data collection frequency. In some embodiments, a frequency of 12.5 Hz or other suitable frequency is employed to balance movement detail with resource usage. Accordingly, in instances when the sensors 121 capture data at 12.5 Hz, a new raw data set can be generated every 12.5 times per second.

In some embodiments, each raw data set may include data points from each sensor 121, such as, e.g., a timestamp, a yaw measurement, a pitch measurement, a roll measurement, an x-axis acceleration (acc_x) measurement, a y-axis acceleration (acc_y) measurement, a z-axis acceleration (acc_z) measurement, an x-axis gyroscopic (gyro_x) measurement, a y-axis gyroscopic (gyro_y) measurement, a z-axis gyroscopic (gyro_z) measurement, or any other sensor measurement to detect movement or any combination thereof. In some embodiments, each raw data set may be provided as structured or unstructured data, such as, e.g., comma-separated-values (CSV), a data table (e.g., a row and/or column of the data points in a table), a vector, key-value pairs, or any other suitable structured or unstructured data. In some embodiments, for example, the data points may be entered as a row in a table of raw data, where each row is ordered according to the timestamp.

In some embodiments, the data processor 123 can split raw data sets into fixed windows implemented as data structure as the one shown at 201 with an overlap between adjacent windows. In some embodiments, the overlap may be, e.g., a 75% overlap, a 70% overlap, a 65% overlap, a 60% overlap, a 55% overlap, a 50% overlap, a 45% overlap, a 40% overlap, a 35% overlap, a 30% overlap, a 25% overlap, a 20% overlap, a 15% overlap, a 10% overlap between adjacent windows or other suitable overlap. The overlap refers to a ratio of an interval of time spanned by a fixed window and an interval of time spanned by an overlap between adjacent fixed windows.

In some embodiments, the window data structure of 201 may include a window of time that is subdivided into sub-windows, where each sub-window is labelled with the action, activity and task recognition engine 127. In some embodiments, by labelling each sub-window, activities and/or tasks may be identified for the window data structure based on the labels for the sub-windows. In some embodiments, rather than labelling the window data structure, the action, activity and task recognition engine 127 may label groups of sub-windows based on the labels of the sub-windows in the group.

In some embodiments, the window data structure and each sub-window may be of fixed length. Thus, the number of sub-windows within the window data structure may be based on the length the window data structure and each sub-window and the overlap between adjacent sub-windows. For example, in an instance of sampling data via sensors 121 for 100 seconds at 12.5 Hz, 1250 raw data sets can be captured and if the window 201 is fixed to a value of 10 seconds then there may be 19 windows considering a 5 second overlap between the window; a first window including raw data sets captured during seconds 0-10, a second window including raw data sets captured during seconds 5-15, and so on until a last window including raw data sets captured during seconds 90-100. Each window can have 125 rows of raw data, wherein each row includes a raw data set.

In some embodiments, the data processor 123 can execute additional computations on the raw data sets, including normalization across raw data captured from different users, standardization of raw data captured from a single user, removal of outlier raw data values, removal of windows including overrepresented activities, oversampling windows of underrepresented activities, down sampling raw data values to ¼, ½, 1, 2, or other suitable fraction.

In some embodiments, the windows data structures produced by the data processor 123 can be utilized by the feature extraction engine 125 to compute feature values used by the action, activity, and task recognition engine 127. For instance, in a 10 second window, the data processor 123 can produce 125 raw data sets that can be used by the feature extraction engine to calculate various features and activity labels associated with each feature.

In some embodiments, the feature extraction engine 125 can perform feature engineering based on the raw data sets. In some embodiments, the features may include time-domain features and/or frequency-domain features for each sub-window of raw data. Example of such features can include, a window start time, a window end time, mean sensor values, standard deviation of sensor values, variance of sensor values, entropy of sensor values, average of maximum and minimum sensor values, number of peaks identified in a Fast Fourier Transform (FFT) signal, number of peaks identified in a Power Spectral Density (PSD) signal, number of peaks identified in an auto-correlation signal, X and Y coordinates of peaks in each of the identified peaks in the FFT signal (e.g., the first five peaks or other suitable number of peaks), the PSD signal, and the auto-correlation signal, cross-correlation measures, zero crossing measures, peak to average ratio, signal magnitude area, signal vector magnitude, differential signal vector magnitude, integration measures, magnitude measures, Hjorth parameters (Mobility, Complexity), and/or other suitable features such as the integral of the accelerometer signal, the integral of the gyroscope signal, the fast Fourier transform of the accelerometer signal, the fast Fourier transform of the gyroscope signal, the power spectral density of the accelerometer signal, the power spectral density of the gyroscope signal, the autocorrelation of the accelerometer signal, the autocorrelation of the gyroscope signal, and other suitable signals.

In some embodiments, for example, during the training phase of a machine learning model implemented in the action activity and task recognition engine 127, the feature data sets generated by the feature extraction engine can be labeled with activity labels. The labeled feature data sets can be used on a supervised training of the machine learning model of the action, activity and task recognition engine 127. For example, the action, activity and task recognition engine 127 may generate labels for the window data structure and/or sub-windows of feature data sets based on the supervised training. Examples, of such labels can include walking 203 and 209, going downstairs 205, riding a forklift 207, remaining still 215, lift, 211, fall 213, and other suitable labels such as riding a pallet jack sitting, standing, off-body (indicating when the sensors 121 are off a user's body, and other suitable activity labels that may include, for example, random motions.

In some embodiments, the features may be encoded into feature vectors, where each feature vector represents the features of a given window or sub-window. Thus, the action, activity and task recognition engine 127 may ingest a feature vector to output a label for the given window or sub-window.

In some embodiments, a measure of how good features are to predict, for example, actions, activities and/or tasks, can be calculated to determine and reduce feature data sets or feature vectors. Such a reduction process can be performed by the execution of a principal components analysis, based on a random forest model, or other suitable feature and/or dimension reduction technique.

In some embodiments, the action, activity, and task recognition engine 127 can include one or more trained multi-classification machine learning model(s). The multi-classification machine learning model can be trained with the labeled feature data sets or labeled vectors generated by the feature extraction engine 125. Some examples of multi-classification machine learning models that can be implemented in the action, activity, and task recognition engine 127 can include extreme gradient boosting classifier, random forest models, decision trees models, neural networks, logistic regression models, naïve Bayes models, AdaBoost models, and other suitable multi-classification machine learning models. In some embodiments, multiple multi-classification machine learning models may be used, e.g., an action multi-classification machine learning model, an activity multi-classification machine learning model, a task multi-classification machine learning model, etc. For example, in some embodiments, an action multi-classification machine learning model may be utilized to generate labels for segments of time having data indicative of actions, an activity multi-classification machine learning model may generate labels of activities based on sequences of actions, and a task multi-classification machine learning model may generates labels for tasks based on sequences of actions and/or activities.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the trained multi-classification machine learning model(s) may include, e.g., gradient boosting classifier models that give a weight to each observation and changes the weight after the training of a classifier. The weight to the wrongly classified observation is increased and the weight to the correctly classified observation is reduced. The observations whose weights have been modified are used to train a subsequent classifier. A gradient boosting model is a sequential ensemble modeling technique that can be implemented in a step-by-step method by focusing on the gradient reduction of a loss function in previous models. The loss function may be interpreted as the degree of error by the model. In general, the greater the loss function, the more likely the model will have misclassified. As the purpose is to minimize the loss function and the error rate, a useful technique is to bring the loss function to decline in the gradient direction.

In some embodiments, the multi-classification machine learning model can be implemented as a gradient boosting decision tree (GBDT). A GBDT is an iterative model process for decision trees. A regression tree and a gradient boosting model can be combined into decision trees, with a predefined trimming. Multiple decision trees are built in the training process, with each tree gradient down by learning from the n−1 number of the tree. Finally, based on the aggregation of all the trees, weights can be produced to generate the final similarity score indicative of an action, activity, or task.

In some embodiments the multi-classification machine learning model can be implemented as an eXtreme gradient boosting tree (XGBoost). An XGBoost model is an optimized version of a gradient boosting machine. The main improvement on GBDT is the normalization of the loss function to mitigate model variances. This also reduces the complexities of modeling and hence the likelihood of model over-fitness. The XGBoost model supports linear classifiers, applicable not only to classifications but also to linear regressions. The traditional GBDT approach only deals with the first derivative in learning, but XGBoost can improve the loss function with, for example, Taylor expansion. While the level of complexities increases for the learning of trees, the normalization prevents the problems associated with over-fitness. In a similar way to the implementation discussed above regarding GBDT, based on the aggregation of all the trees, weights can be produced to generate the final similarity score indicative of an action, activity, or task.

In some embodiments, hyperparameters of a gradient boosting model can be tuned. For example, the number of boosting stages can be configured to correspond to n-estimators—100, 200, 5000, or other suitable values. The learning rate which shrinks the contribution of each tree in the model can be configured to a learning rate—0.5, 0.1, 0.01, or other suitable values. The function to measure the quality of a node split can be configured as "friedman_mse" to utilize a mean squared error with improvement score by Friedman, "mse" to utilize a mean squared error, or other suitable function. The maximum depth of the individual regression estimators can be used to limit the number of nodes in a tree of the model and can be configured to correspond to max_depth—3, 6, 10, or other suitable values.

In some embodiments, combinations of hyperparameters such as n-estimators, learning rate, criterion, and max_depth can be used to generated forests of the gradient boosting model. For example, forests in the gradient boosting model can be generated using a combination of hyperparameters such as (n_estimators=100, learning_rate=0.5, criterion=friedman_mse, max_depth=3) resulting in an accuracy of a train score=1.00000 and a test score=0.90900. Likewise, forests can be generated using a combination of hyperparameters such as (n_estimators=100, learning_rate=0.5, criterion=friedman_mse, max_depth=6) resulting in an accuracy of a train score=1.00000 and a test score=0.91524. For another example, forests in the gradient boosting model can be generated using a combination of hyperparameters such as (n_estimators=100, learning_rate=0.5, criterion=mse, max_depth=3) resulting in an accuracy of a train score=1.00000 and a test score=0.90692. It is understood that other hyperparameters can be equally used, for example, (n_estimators=5000, learning_rate=0.1, criterion=friedman_mse, max_depth=6), or other suitable combination of hyperparameter values.

In some implementations, the multi-classification machine learning model can be evaluated during training phase. The evaluation of the multi-classification machine learning model can include using a training data set and a testing data set. For example, data can be captured via the sensors 121, such data can be labeled as discussed above and can be associated with one or more users. The labeled data can be split, for example, 75% of the labeled data can be used for training purposes and 25% of the labeled data can be used for testing purposes. It is understood that the labeled data can be divided in other ways, for example, 50% of the labeled data can be used for training purposes and 50% of the labeled data can be used for testing purposes, or other suitable division. Additionally, or alternatively, the evaluation of the multi-classification machine learning model can be performed by a leave-one-out cross-validation method, per data collected from one person. In some instances, the performance of the multi-classification machine learning can be evaluated by classification accuracy measures and a confusion matrix. The confusion matrix can be used to determine whether some classes are easier or more challenging to predict than others, such as those for stationary activities versus those activities that involve motion.

In some embodiments the training data for the multi-classification machine learning model can be performed based on a controlled acquisition process. Users wearing the sensors 121 can engage in multiple activities such as walking, taking the stairs down, taking the stairs up, sitting, standing, or other suitable activities. The time a person takes to perform the activities can be tracked and the captured sensor data can be labeled according to the activity performed by the user at the corresponding time. It is understood, that other controlled acquisition processes can similarly be used to generate the training data.

Figure 3:
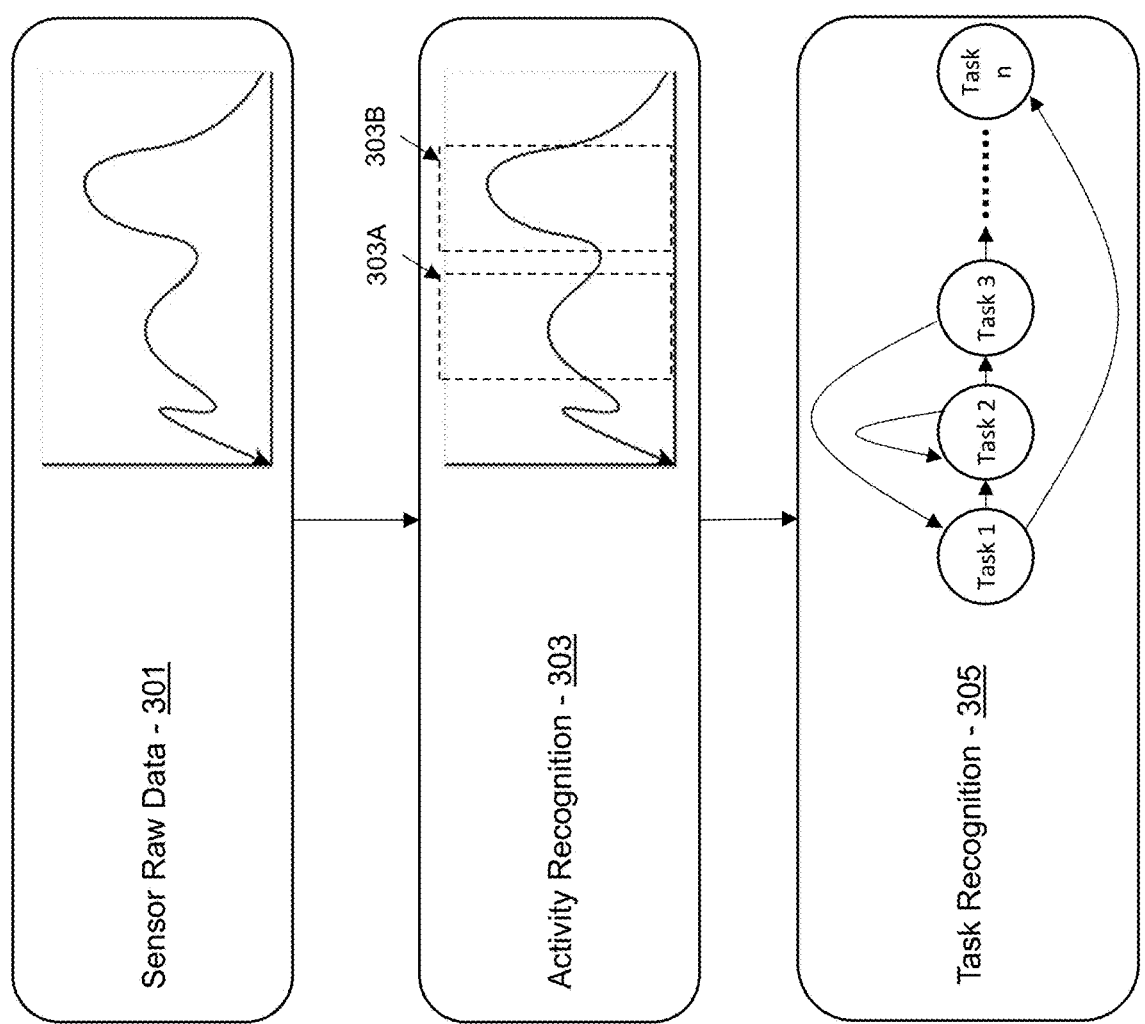

FIG. 3 is a flowchart illustrating examples of computations executed by action, activity, and task classification system 100, in accordance with one or more embodiments of the present disclosure. In some implementations, the system 100 can receive raw sensor data 301, as discussed above, the raw sensor data can be captured and/or collected via the sensors 121 discussed with reference to FIG. 1. Thereafter, the classification system 117 (also discussed with reference to FIG. 1) can execute an activity recognition process at 303 and classify the raw sensor data into different activities, represented by the solid bars 303A and 303B. After the raw sensor data is classified into one or more activities the classification system 117 can further classify activities into tasks as shown at 305. In some instances, tasks can be defined as series of one or more actions and/or activities. It is noted that that the classification system 117 can determine transitions between tasks for example the transition from task 305B to task 305A in a non-sequential order.

Figure 4:
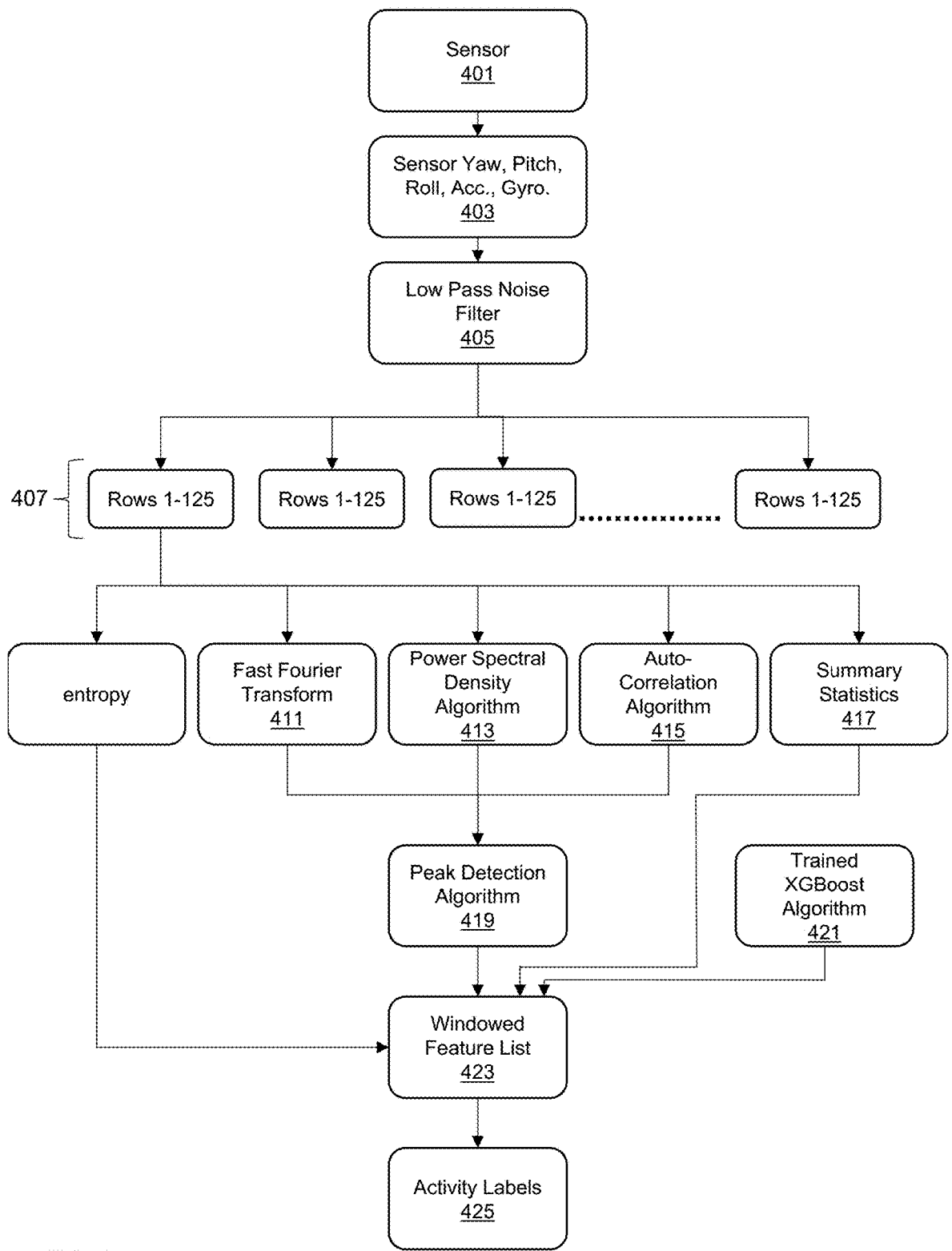

FIG. 4 is a flowchart illustrating examples of computations executed by action, activity, and task classification system 100, in accordance with one or more embodiments of the present disclosure. In some instances, sensors 401 can be activated and worn by a person. The sensors 401 can transmit activity data or raw sensor data to the system 100 as shown at 403. Some examples, of such activity data can include captured data associated with yaw motions, pitch motions, roll motions, activity data captured via an accelerometer, activity data captured via a gyroscope, and/or other suitable raw sensor data. In some embodiments, the raw sensor data 403 may be provided as a table of data where each row in the table includes the values from each sensor measurement at a particular time stamp. Thus, each raw data set may include a row of data in the table.

In some embodiments, the raw sensor data capture at 403 can be processed by a low pass noise filter as shown at 405 to produce filtered data sets (e.g., filtered values in rows of the table). Thereafter, at 407 windows data structures are generated as discussed with reference to FIG. 2. The window data structures 407 can contain values filtered by the low pass noise filter 405. In some embodiments, where data is represented as rows in a table, each window data structure may include a sequence of rows spanning an interval of time as described above, e.g., rows 1 to 125 include a number of data samples based on the sampling frequency and the interval of time (e.g., 125 data sets for 10 seconds of 12.5 Hz data). An example of a table of data sets is provided in Table 1 below:

TABLE 1

Example Data Sets of Sensor Measurement Values

| Roll | Pitch | Yaw | Acele X | Acele Y | Acele Z |
|---|---|---|---|---|---|
| −48.8477 | 79.43673 | 31.68695 | −1.02045 | −0.07924 | −0.05504 |
| −51.1041 | 74.13458 | −26.039 | −0.91627 | −0.11363 | 0.102557 |
| −38.4386 | 77.4336 | −16.4856 | −0.97649 | −0.07362 | 0.065968 |
| −51.5205 | 77.36588 | −21.6503 | −0.93782 | −0.10724 | 0.0679 |
| −51.6055 | 75.23854 | 2.634851 | −0.84598 | −0.09634 | 0.072344 |
| −49.1561 | 78.92686 | −14.9543 | −0.87557 | −0.10231 | 0.066033 |
| −34.1038 | 78.47287 | 0.662153 | −0.96699 | −0.05763 | 0.0555 |
| −61.5997 | 78.29645 | 25.73027 | −0.98694 | −0.10923 | 0.027487 |
| −47.6216 | 79.35548 | −4.41751 | −0.92841 | −0.06474 | −0.03417 |
| −49.57 | 75.62729 | −3.19576 | −0.91146 | −0.15145 | 0.042949 |
| −44.483 | 78.56267 | −0.08604 | −0.98658 | −0.06189 | 0.020399 |
| −36.9248 | 72.37045 | 9.032586 | −0.82319 | −0.12063 | 0.022845 |
| −31.9513 | 80.41698 | 7.076754 | −0.93912 | −0.11001 | −0.00213 |

| Gyro X | Gyro Y | Gyro Z | Magnet X | Magnet Y | Magnet Z |
|---|---|---|---|---|---|
| −3.02048 | 8.025932 | 4.121749 | 99.08597 | 6.621989 | 103.5586 |
| 0.012112 | −1.73661 | −0.25752 | 70.78805 | 19.18395 | 107.7521 |
| 1.067638 | −4.87305 | 2.249463 | 89.48307 | 12.86348 | 111.9857 |
| 1.021544 | −0.25015 | 2.140935 | 62.59145 | 8.272105 | 112.2754 |
| −4.7471 | 1.578363 | 0.153319 | 74.84111 | 20.23321 | 99.73019 |
| 2.046935 | −1.05759 | −1.5701 | 77.50944 | 6.824003 | 108.8388 |
| −1.51784 | −2.38911 | −0.1744 | 94.91146 | 12.47394 | 104.9704 |
| 3.569603 | −5.22486 | −5.961 | 77.2422 | 12.63392 | 105.015 |
| 0.811704 | −3.74908 | −2.46881 | 86.60876 | 7.431273 | 103.0511 |
| 6.074301 | 2.772427 | −1.99976 | 63.16688 | 13.96136 | 117.9705 |
| 1.381175 | −7.86355 | −0.87296 | 84.71583 | 18.10186 | 91.78927 |
| −1.44895 | −2.41766 | −3.02941 | 97.80218 | 22.18934 | 96.9578 |
| −0.19048 | −6.34333 | 0.768439 | 99.91866 | 5.537394 | 106.8785 |

The data included in the instantiated window data structures 407 can computed by the feature extraction engine 125 discussed with reference to FIG. 1, to generate features and feature values of those features by computing, for example, entropy 409, fast Fourier Transform 411, power spectral density 413, autocorrelation 415, summary statistics 417 (e.g., mean, standard deviation, and variance), and other suitable calculations.

In some embodiments, the number of peak values may be calculated from the output of the fast Fourier Transform 411, the power spectral density 413, and the autocorrelation 415 via the peak value detection algorithm 419. In some implementations, the entropy values generated at 409, the peak values detected by the peak detection algorithm 419, and the summary statistics 417 can be used to generate features window data structures 423 containing lists of features with their respective feature values that can serve as predictors of a user's motion or pose. The trained machine learning model 421 can utilize the feature window data structures 423 to determine activity labels indicating categories of actions, activities, and/or tasks based on the feature values contained in the features window data structures 423 as shown at 425.

In some embodiments, the activity labels 425 i.e., categorized data can be sent by the system 100 to a computing device associated with the user. In some other embodiments, the system 100 can emit an indication of the activity label via, for example, the input/output interface 113. Such an indication can include, for example, a signal transmitted via output peripherals such as displays, light emitting diodes, vibrating motors, speakers, or other suitable output peripheral of system 100. In some embodiments, the signal transmitted via the output peripheral can further comprise a recommendation or safety warning to the user, for example, a recommendation indicating to perform an action, activity, or task in an ergonomically correct manner or a warning indicating that the user is engaging in a dangerous or unsafe action, activity, or task.

Figure 5:
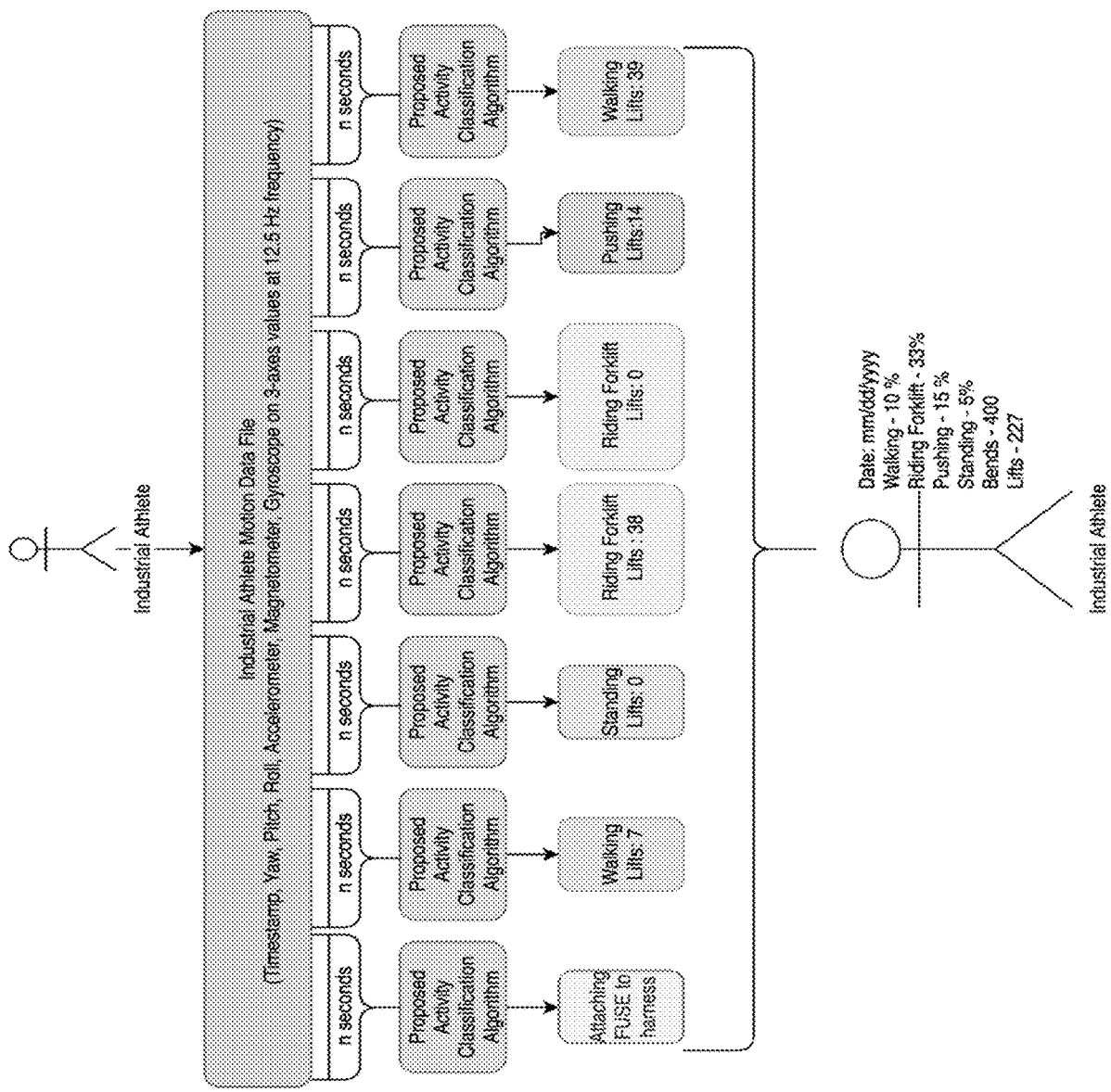

FIG. 5 is a flowchart illustrating examples of computations executed by the action, activity, and task classification system 100, in accordance with one or more embodiments of the present disclosure. In some instances, a user 501 can perform several actions, activities, and/or tasks continuously over time. In some instances, a motion data file 503 can be generated containing sensor data captured by sensors 121 while the user 501 performs such actions, activities and/or tasks. The motion data file 503 can include timestamps indicating when a motion is initiated or terminated, and data captured by sensors 121 including yaw sensors, pitch sensors, roll sensors, accelerometer sensors, magnetometer sensors, and gyroscope sensors on 3 axes values. The sensor data can be captured at a frequency of 12.5 HZ or other suitable frequency e.g., from 5 HZ to 50 HZ or other suitable range. In some implementations, the user 501 can perform various motions or poses over time represented at 507. Thereafter, the multi-classification machine learning model can infer or identify actions, activities, and/or tasks from such motions based on the sensor data as shown at 509. The multiclassification machine learning model can convert sensor data into actions, activities, and/or tasks as shown at 511. Thereafter, the system 100 can provide to the user 501 a summary of actions, activities, and/or tasks performed during a time specified by a timestamp as shown at 513.

Figure 6:
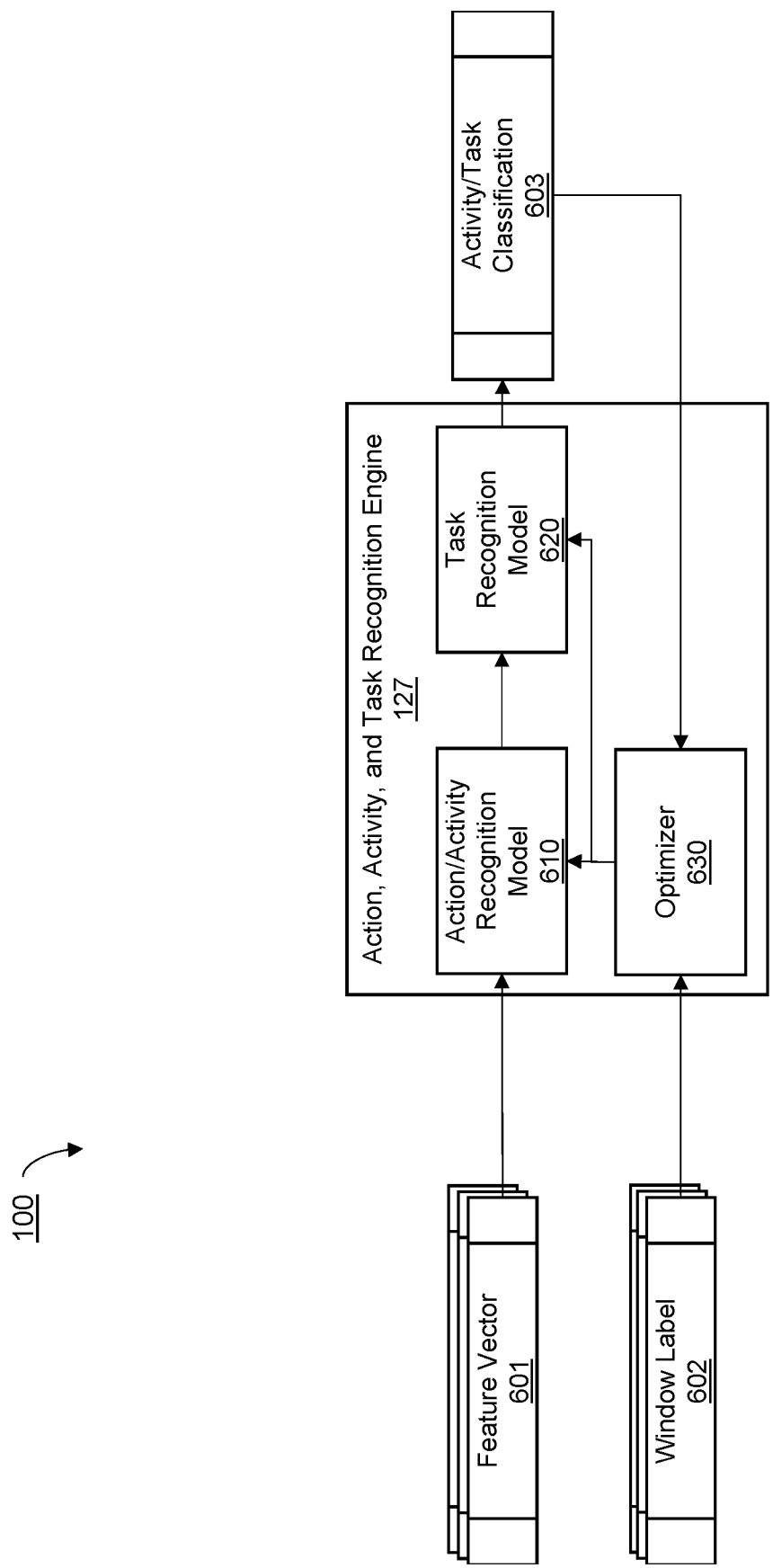

FIG. 6 is a flowchart illustrating examples of training the action, activity, and task classification system 100, in accordance with one or more embodiments of the present disclosure.

In some embodiments, the action, activity, and task classification system 100 may utilize the action, activity, and task recognition engine 127 to predict an activity/task classification 603 for the feature vector 601 produced by the feature extraction engine 125 as described above.

In some embodiments, the action, activity, and task recognition engine 127 ingests the feature vector 601 and produces a prediction of an activity/task classification 603 for each feature vector 601. In some embodiments, to produce this prediction, the action, activity, and task recognition engine 127 may include an action/activity recognition model 610 including a machine learning model for producing a label for the feature vector 601 for an action and/or activity for an interval of time. In some embodiments, the action/activity recognition model 610 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model.

In some embodiments, the action, activity, and task recognition engine 127 may include an task recognition model 620 including a machine learning model for producing a label for the feature vector 601 for task for an interval of time based on the feature vector 601 and the action and/or activity label. In some embodiments, the task recognition model 620 may produce the task label for a sequence of action and/or activity labels based on a sequence of feature vectors 601. In some embodiments, the task recognition model 620 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model Accordingly, the action, activity, and task recognition engine 127 ingests a feature vector 601 and processes the attributes encoded therein using the action/activity recognition model 610 and the task recognition model 620 to produce a model output vector. In some embodiments, the model output vector may be decoded to generate a label including the activity/task classification 603.

In some embodiments, the model output vector may include or may be decoded to reveal a numerical output, e.g., a probability value between 0 and 1. In some embodiments, the probability value may indicate a degree of probability that the data sets from the sensors 121 of the feature vector 601 indicates a particular action/activity/task. In some embodiments, the action/activity recognition model 610 and the task recognition model 620 may include multi-classification models. The output vector may include a probability value for each classification, where the classification with a greatest probability value is output as the activity/task classification 603. In some embodiments, the action, activity, and task recognition engine 127 may test each probability value against a probability threshold, where a probability value greater than the probability threshold indicates, e.g., that the data sets from the sensors 121 indicates the corresponding classification, or that the data sets from the sensors 121 does not indicates the corresponding classification. For example, the probability threshold can be, e.g., greater than 0.5, greater than 0.6, greater than 0.7, greater than 0.8, greater than 0.9, or other suitable threshold value. In some embodiments, the action, activity, and task recognition engine 127 may produce a selection of labels based on the probability value of each label in the selection of labels exceeding the probability threshold. The label with the greatest probability value may then be selected as the activity/task classification 603.

In some embodiments, the action, activity, and task recognition engine 127 may trained based on the activity/task classification 603 and a window label 602. In some embodiments, the window label 602 may be a ground-truth annotation to the input data sets of the feature vector 601. Thus, each feature vector 601 may have a ground-truth window label 602 (e.g., as a result of human annotation). Based on the difference between the activity/task classification 603 and the window label 602, the parameters of the action/activity recognition model 610 and the task recognition model 620 of the action, activity, and task recognition engine 127 may be updated to improve the accuracy of the activity/task classification 603.

In some embodiments, training is performed using the optimizer 630. In some embodiments, the activity/task classification 603 fed back to the optimizer 630. In some embodiments, the optimizer 630 may employ a loss function, such as, e.g., Hinge Loss, Multi-class SVM Loss, Cross Entropy Loss, Negative Log Likelihood, or other suitable classification loss function. The loss function determines an error based on the window label 602 and the activity/task classification 603. In some embodiments, the optimizer 630 may, e.g., backpropagate the error to the action, activity, and task recognition engine 127 to update the parameters using, e.g., gradient descent, heuristic, convergence or other optimization techniques and combinations thereof. In some embodiments, the optimizer 630 may therefore train the parameters of the action/activity recognition model 610 and the task recognition model 620 to recognize a user's behavior based on data from the sensors 121.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement system 100 consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described with reference to the following numbered clauses.

Clause 1. An apparatus, comprising:
  a processor;
  a set of sensors; and
  a non-transitory memory storing instructions which, when executed by the processor, causes the processor to:
    capture raw sensor data while a user performs a series of activities wearing the set of sensors for a predetermined time;
    convert the raw sensor data into a set of feature values;
    input the set of feature values into a machine learning model to generate a set of categories corresponding to a plurality of an activity, action, or task performed by the user during the predetermined time; and transmit, based on the set of categories, to a computing device associated with the user, a message comprising an indication representative of the plurality of an activity, action, or task Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added, and/or any desired steps may be eliminated).

What is claimed is:

1. An apparatus, comprising:
   a processor; and
   a non-transitory memory storing instructions which, when executed by the processor, causes the processor to:
      capture raw sensor data while a user performs a series of activities wearing at least one sensor;
         wherein the raw sensor data is for a predetermined interval of time;
         wherein the predetermined interval of time comprises a series of timestamps;
         wherein the raw sensor data comprises at least one movement measurement at each timestamp in the series of timestamps in the predetermined interval of time;
      convert the raw sensor data into a set of feature values;
      utilize an action recognition machine learning model to generate a set of action labels for the predetermined interval of time based on trained action model parameters and the set of feature values;
         wherein the set of action labels are indicative of at least one action category of at least one action performed by the user during the predetermined interval of time;
      utilize an activity recognition machine learning model to generate a set of activity labels for the predetermined interval of time based at least in part on trained activity model parameters and the set of action labels;
         wherein the set of activity labels are indicative of at least one activity performed by the user during the predetermined interval of time;
         wherein the at least one activity represents at least one action sequence comprising the at least one action performed by the user during the predetermined interval of time;
      utilize a task recognition machine learning model to generate a set of task labels for the predetermined interval of time based at least in part on trained task model parameters, the set of action labels and the set of activity labels;
         wherein the set of task labels are indicative of at least one task category of at least one task performed by the user during the predetermined interval of time;
         wherein the at least one task is associated with at least one of:
            the at least one action sequence comprising the at least one action performed by the user during the predetermined interval of time, and
            at least one activity sequence comprising the at least one activity performed by the user during the predetermined interval of time; and
      transmit, to a computing device associated with the user, a message comprising an indication representative of the set of task labels indicative of the at least one task.

2. The apparatus as recited in claim 1, wherein the activity recognition machine learning model comprises a multi-classification machine learning model.

3. The apparatus as recited in claim 1, wherein the action recognition machine learning model comprises a multi-classification machine learning model.

4. The apparatus as recited in claim 1, wherein the task recognition machine learning model comprises a multi-classification machine learning model.

5. The apparatus as recited in claim 1, wherein the instructions, when executed by the processor, further cause the processor to determine at least one time-domain feature based at least in part on a timestamp associated with each raw sensor data record of the raw sensor data.

6. The apparatus as recited in claim 1, wherein the instructions, when executed by the processor, further cause the processor to determine at least one frequency-domain feature based at least in part on a frequency associated with each raw sensor data record of the raw sensor data.

7. The apparatus as recited in claim 1, wherein the instructions, when executed by the processor, further cause the processor to:
   generate a plurality of windows of data;
      wherein each window of data of the plurality of windows of data comprises a fixed interval of time that is less than the predetermined interval of time;
      wherein each window of data of the plurality of windows of data overlaps with a subsequent window of data of the plurality of windows of data to form overlapping windows of data; and
   convert the raw sensor data into a subset of feature values of the set of feature values for each window of data of the plurality of windows of data.

8. The apparatus as recited in claim 1, wherein the raw sensor data comprises sensor measurements captured at a 12.5 Hertz (Hz) frequency.

9. The apparatus as recited in claim 1, wherein each sensor measure of the sensor measurements comprise at least one of:
   i) a timestamp,
   ii) at least one yaw measurement,
   iii) at least one pitch measurement,
   iv) at least one roll measurement,
   v) at least one x-axis acceleration (acc_x) measurement,
   vi) at least one y-axis acceleration (acc_y) measurement,
   vii) at least one z-axis acceleration (acc_z) measurement,
   viii) at least one x-axis gyroscopic (gyro_x) measurement,
   ix) at least one y-axis gyroscopic (gyro_y) measurement, and
   x) at least one z-axis gyroscopic (gyro_z) measurement.

10. A method, comprising:
    receiving, by a processor, raw sensor data while a user performs a series of activities wearing at least one sensor;
       wherein the raw sensor data is for a predetermined interval of time;
       wherein the predetermined interval of time comprises a series of timestamps;

wherein the raw sensor data comprises at least one movement measurement at each timestamp in the series of timestamps in the predetermined interval of time;

converting, by a processor, the raw sensor data into a set of feature values;

utilizing, by a processor, an action recognition machine learning model to generate a set of action labels for the predetermined interval of time based on trained action model parameters and the set of feature values;

wherein the set of action labels are indicative of at least one action category of at least one action performed by the user during the predetermined interval of time;

utilize an activity recognition machine learning model to generate a set of activity labels for the predetermined interval of time based at least in part on trained activity model parameters and the set of action labels;

wherein the set of activity labels are indicative of at least one activity performed by the user during the predetermined interval of time;

wherein the at least one activity represents at least one action sequence comprising the at least one action performed by the user during the predetermined interval of time;

utilizing, by a processor, a task recognition machine learning model to generate a set of task labels for the predetermined interval of time based at least in part on trained task model parameters, the set of action labels and the set of activity labels;

wherein the set of task labels are indicative of at least one task category of at least one task performed by the user during the predetermined interval of time;

wherein the at least one task is associated with at least one of:

the at least one action sequence comprising the at least one action performed by the user during the predetermined interval of time, and at least one activity sequence comprising the at least one activity performed by the user during the predetermined interval of time; and transmitting, by a processor, to a computing device associated with the user, a message comprising an indication representative of the set of task labels indicative of the at least one task.

11. The method as recited in claim 10, wherein the activity recognition machine learning model comprises a multi-classification machine learning model.

12. The method as recited in claim 10, wherein the action recognition machine learning model comprises a multi-classification machine learning model.

13. The method as recited in claim 10, wherein the task recognition machine learning model comprises a multi-classification machine learning model.

14. The method as recited in claim 10, further comprising determining, by a processor, at least one time-domain feature based at least in part on a timestamp associated with each raw sensor data record of the raw sensor data.

15. The method as recited in claim 10, further comprising determining, by a processor, at least one frequency-domain feature based at least in part on a frequency associated with each raw sensor data record of the raw sensor data.

16. The method as recited in claim 10, further comprising:

generating, by a processor, a plurality of windows of data;

wherein each window of data of the plurality of windows of data comprises a fixed interval of time that is less than the predetermined interval of time;

wherein each window of data of the plurality of windows of data overlaps with a subsequent window of data of the plurality of windows of data to form overlapping windows of data; and converting, by a processor, the raw sensor data into a subset of feature values of the set of feature values for each window of data of the plurality of windows of data.

17. The method as recited in claim 10, wherein the raw sensor data comprises sensor measurements captured at a 12.5 Hertz (Hz) frequency.

18. The method as recited in claim 17, wherein each sensor measurement of the sensor measurements comprise at least one of:

i) a timestamp, ii) at least one yaw measurement, iii) at least one pitch measurement, iv) at least one roll measurement, v) at least one x-axis acceleration (acc_x) measurement, vi) at least one y-axis acceleration (acc_y) measurement, vii) at least one z-axis acceleration (acc_z) measurement, viii) at least one x-axis gyroscopic (gyro_x) measurement, ix) at least one y-axis gyroscopic (gyro_y) measurement, and x) at least one z-axis gyroscopic (gyro_z) measurement.

* * * * *